United States Patent
Williams

(10) Patent No.: US 10,288,041 B2
(45) Date of Patent: May 14, 2019

(54) RENEWABLE ENERGY SYSTEM HAVING A DISTRIBUTED ENERGY STORAGE SYSTEMS AND PHOTOVOLTAIC COGENERATION

(71) Applicant: Kevin R. Williams, Cypress, TX (US)

(72) Inventor: Kevin R. Williams, Cypress, TX (US)

( * ) Notice: Subject to any disclaimer, the term of this patent is extended or adjusted under 35 U.S.C. 154(b) by 0 days.

(21) Appl. No.: 15/401,312

(22) Filed: Jan. 9, 2017

(65) Prior Publication Data
US 2018/0195495 A1    Jul. 12, 2018

(51) Int. Cl.
| | |
|---|---|
| F03D 9/00 | (2016.01) |
| H02J 3/38 | (2006.01) |
| F03D 9/11 | (2016.01) |
| F03D 9/25 | (2016.01) |
| H02J 3/32 | (2006.01) |
| H02J 1/10 | (2006.01) |

(52) U.S. Cl.
CPC ............... *F03D 9/007* (2013.01); *F03D 9/11* (2016.05); *F03D 9/257* (2017.02); *H02J 3/32* (2013.01); *H02J 3/383* (2013.01); *H02J 3/386* (2013.01); *H02J 1/102* (2013.01); *Y02E 10/725* (2013.01)

(58) Field of Classification Search
CPC .. F03D 9/007; F03D 9/257; F03D 9/11; H02J 3/386; H02J 3/383
See application file for complete search history.

(56) References Cited

U.S. PATENT DOCUMENTS

| | | | |
|---|---|---|---|
| 7,476,987 B2 | 1/2009 | Chang | |
| 7,855,476 B2 | 12/2010 | Kawazoe et al. | |
| 7,923,965 B2 | 4/2011 | Ritter et al. | |
| 7,932,621 B1* | 4/2011 | Spellman | H02J 3/383 307/2 |
| 8,247,917 B2* | 8/2012 | Yasugi | H02P 9/10 290/44 |
| 8,275,489 B1 | 9/2012 | Devine | |
| 8,378,621 B2* | 2/2013 | Singhal | F03D 9/007 136/246 |
| 8,539,724 B2 | 9/2013 | Bullivant et al. | |
| 8,688,286 B2* | 4/2014 | Nelson | H02J 3/28 290/44 |
| 9,048,694 B2* | 6/2015 | Pan | H02J 3/36 |
| 2003/0227172 A1* | 12/2003 | Erdman | F03D 7/0284 290/44 |
| 2008/0088131 A1* | 4/2008 | Thisted | H02J 3/38 290/44 |
| 2009/0200808 A1* | 8/2009 | Parmley, Sr. | F03D 9/007 290/55 |

(Continued)

*Primary Examiner* — Jared Fureman
*Assistant Examiner* — Michael J Warmflash
(74) *Attorney, Agent, or Firm* — Egbert, McDaniel & Swartz, PLLC

(57) ABSTRACT

A renewable energy system has a plurality of turbine separately connected to a line so as to form a turbine string, a plurality of turbine transformers separately and respectively connected to the plurality of turbines, a plurality of energy storage systems separately and respectively connected to the plurality of turbine transformers so as to store energy from the turbines, and a distribution transformer connected to the turbine strings so as to raise a voltage from the turbine strings to a grid voltage. The plurality of turbines are wind power turbine systems. The energy storage system is either a battery or a capacitor. A photovoltaic array can be connected to each turbine.

10 Claims, 11 Drawing Sheets

(56) References Cited

U.S. PATENT DOCUMENTS

| | | | |
|---|---|---|---|
| 2011/0187106 A1* | 8/2011 | Ichinose | F03D 7/048 290/44 |
| 2012/0043759 A1* | 2/2012 | Bjork | H02J 3/46 290/44 |
| 2012/0053750 A1 | 3/2012 | Biassolo et al. | |
| 2012/0080955 A1* | 4/2012 | Fishman | H01L 31/02021 307/82 |
| 2012/0101643 A1* | 4/2012 | Kirchner | F03D 7/0284 700/287 |
| 2013/0268222 A1 | 10/2013 | Arya et al. | |
| 2013/0274946 A1* | 10/2013 | Schelenz | H02J 3/383 700/297 |
| 2014/0035289 A1* | 2/2014 | Eichler | H05K 7/1432 290/55 |
| 2015/0318705 A1* | 11/2015 | Lucas | H02J 3/381 307/129 |
| 2016/0241153 A1* | 8/2016 | Abeyasekera | H02M 7/493 |
| 2016/0248254 A1* | 8/2016 | Huomo | H02J 13/0006 |

* cited by examiner

US 10,288,041 B2

RENEWABLE ENERGY SYSTEM HAVING A DISTRIBUTED ENERGY STORAGE SYSTEMS AND PHOTOVOLTAIC COGENERATION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to renewable energy systems, such as a wind farm. More particularly, the present invention relates to renewable energy systems that employ the use of an energy storage system associated with each turbine of the renewable energy system. More particularly, the present invention the relates to wind farms that allow solar panels and photovoltaic arrays to be connected with the system.

2. Description of Related Art Including Information Disclosed Under 37 CFR 1.97 and 37 CFR 1.98

Wind is the movement of air, which has mass, and when air is in motion it contains kinetic energy. A wind energy system converts the kinetic energy of wind into mechanical or electrical energy that can be harnessed for practical use. Wind energy systems which harness the wind and convert it to electrical energy are generally referred to as wind turbines. As air flows past the rotor of a wind turbine, the rotor spins and drives the shaft of an electrical generator to produce electricity. The electricity generated by a wind turbine can be collected and fed into utility power lines, where it is mixed with electricity from other power plants and delivered to utility customers.

Wind turbines are routinely placed in groups. These groups of wind turbines are referred to as wind farms. Wind farms have been in existence for many years and are located in many countries. In the United States, the Department of Energy publishes reports each year that identify details relative to the wind farms in the United States. Wind farms generally refer to large-scale, commercial electricity-producing operations. The capacity of the wind turbines in large wind farms can produce nearly three megawatts per wind turbine. The wind farm can have one-thousand wind turbines or more. The goal and direction of wind energy producers appears to have larger farms with greater capacity. These wind farms generally require a large tract of land and transmission lines with significant capacity to transmit the power that is generated from the wind turbine.

The utility-scale wind energy system or wind farm includes a group of wind turbines that operate collectively as a power plant to produce electrical energy without consuming fossil fuels. The output of wind energy from a wind farm is less consistent than the energy output from fossil fuel-powered power plants. As a result, the power from wind turbines operating at nominal conditions of a wind farm may not meet output requirements for the power plant. For example, the power from a power plant may not track the power forecast due to forecast errors. As another example, the rate of power production for a power plant may be outside of a desired range because of wind gusts. A conventional approach for dealing with these and other similar situations is to use controls to manage the operation of the wind farm, such as utilizing pitch control of the rotor blades to increase or decrease the power produced by the individual wind turbines.

A wind farm a include an energy storage device, such as batteries, that is linked to the power grid and may assist in meeting requirements on the power production by the power plant. Energy storage systems can be used to shift power production by the wind farm from off-peak times to peak-load times. Energy storage system can store curtailed production for later release to the power grid. The ability to store energy during times of high wind turbine production and release the stored energy during times of low wind production also allows a wind farm to improve power production forecast accuracy. The accuracy improvements allows wind farms to meet firm capacity commitments of the power companies and avoid expensive penalties.

The desire to maintain a generally constant power to the grid or to controllably adjust the power released to the grid has produced various schemes of energy storage. The most popular means of storage is a battery bank. In a battery bank, a very large number of high-capacity batteries are stored in a single facility. Typically, because of the risk of explosion, this facility is constructed of a high-strength material. As a result, these battery bank facilities are very expensive. In large wind farms, these can have a capital cost of approximately $20 million. Unfortunately, because of all the batteries that are used to store the energy from the wind farm are kept in a single facility, if the facility should become damaged or the batteries within the facility should become damaged, the entire storage system can go down. Additionally, because of the large capital cost invested in the facility and in the batteries, it is not adaptable to developing battery technology. Developing battery technology continually produces batteries having greater storage capacity. It was felt to be necessary to have a large battery bank since the power from each wind turbine in the wind farm can be variable.

In the past, alternative energy sources, such as the solar panels and photovoltaic arrays, have not been used in conjunction with wind farms. These photovoltaic arrays produce DC power. This is incompatible with the AC power produced by the wind energy generator.

Wind power generators always have inverter modules associated therewith. These inverter modules typically have a cabinet with six inverter modules therein. The six inverter modules are received in slots within the inverter cabinet. The inverter cabinet is of a high-strength material since the inverter modules are prone to explosion. Since these inverter modules are limited by the capacity of the cabinet, current systems that are available on the market only have the capacity for six inverter modules therein. As such, there is a lack of space and capacity for including additional inverter modules with the wind energy generator.

FIG. 1 shows a renewable energy system 10, such as a wind farm, as provided in the prior art. This is a typical layout for a renewable energy site. As can be seen, the plurality of turbines 12 are connected along a turbine string 14. Turbine transformers 16 are connected between the turbine 12 and the turbine string 14. The turbine transformers 16 serves to convert the voltage from the turbines 12 into a transmission voltage along the turbine string 14. This transmission voltage is typically thirty-five kilovolts. As such, it is considered a "medium voltage". There can be an extremely large number of turbines 12 provided along the turbine string. There can be a large number of turbines on a single string, typically, the number of turbines can be up to fifteen turbines. Another plurality of turbines 18 are connected along another turbine string 20. A large number of turbine strings, such as turbine strings 14 and 20 can be provided in the wind farm 10. Ultimately, the end string 22 will be connected to turbines 24. Each of the turbine strings 14, 20 and 22 is connected to a distribution line 26. This distribution line will carry the medium voltage to a distribution transformer 28. Distribution transformer 28 serves to convert the voltage from the distribution line 26 into the grid voltage. As such, the grid voltage will be transmitted with a higher voltage and a lower current. Ultimately, the distribution transformer 28 will feed the power to the main utility grid transmission line 30. This will typically transmit greater than 100 kV.

FIG. 2 shows a prior art wind farm 32 having a configuration similar to that shown in FIG. 1. However, in FIG. 2, an energy storage system 34 is connected to the transmission line 26. This energy storage system 34, in accordance with the prior art, would be a battery bank contained within a battery facility. A transformer 36 is connected to the distribution line 26 so as to convert the voltage from distribution line 26 into a low voltage for the energy storage system. A charge/discharge controller 38 is connected to the line 40 from transformer 36. The charge/discharge controller 38 can then control the delivery of power to the batteries 42 and control the discharge of energy from the batteries 42.

Through the use of the scheme FIG. 2, the battery bank 42 can be used so as to release energy to the distribution transformer 28 and then to the grid 30 during times in which the energy produced by the wind turbines is low. During times of high wind, the battery bank 42 can store that energy which is above the requirements of the grid 30. Any excess energy beyond the capacity of the battery bank 42 would be discharged in the form of heat.

It was felt to be very important to include a single battery bank 42 in association with the wind farm 32. First, the use of a battery bank places the energy storage capacity in a single location. Secondly, since each of the turbines and associated turbine transformers is an AC voltage system, the battery bank 42 has the capacity to store such voltage. The charging and discharging from a single battery bank 42 was felt to be more efficient for the delivery of power to the grid 30. Unfortunately, the battery bank 42 has the problems recited hereinbefore. Ultimately, the battery bank 42 will require a very large additional transformer, such as transformer 36, to connect the energy storage system 34 together. It also requires the necessary power electronics to control charge and discharge of the battery array in the charge/discharge controller 38.

In the past, various patents have issued relating to wind farms and the control of energy from the wind farms. For example, U.S. Pat. No. 7,476,987, issued on Jan. 13, 2009 to L. Chang, provides a wind turbine/battery dump load renewable energy system and the optimal control of such renewable energy system. The system includes both power conversion and control units. The power conversion system features a wind turbine three-phase induction generator, a diode rectifier, a battery charger, a boost AC/DC converter, a battery bank, and a DC/AC inverter. A dump load is also used to dissipate excess power that is not required for either the battery charging or for the load. An integrated control unit allows the operation of the wind power system and the battery storage system to be merged into a single package under a master controller.

U.S. Pat. No. 7,855,476, issued on Dec. 21, 2010 to Kawazoe et al., describes a hybrid system using a wind power generator and a battery energy storage system that includes a unit to set a system constant output value, a unit to control power generated from the wind power generator, a unit to gradually change an output target value between an output constant operation and a regulation control operation, and a control unit to secure a charged ampere-hour of a battery in the output constant operation.

U.S. Pat. No. 7,923,965, issued on Apr. 12, 2011 to Ritter et al., teaches a method for coupling an energy storage system to a variable energy supply system. This method includes an energy storage system having at least one vanadium redox battery and at least one battery charge controller. The method includes electrically coupling the battery charge controller to the variable energy supply system such that the battery is configured to supply a substantially consistent energy output during fluctuating energy loads of the energy supply system.

U.S. Pat. No. 8,247,917, issued on Aug. 21, 2012 to Yasugi et al., discloses a control method for a wind turbine generator and a storage battery unit connected to a power grid in parallel. This control method includes calculating total active power and total reactive power and switching between a first mode in which the generator output outputs turbine-required active power and reactive power that can be outputted by the generator and the battery unit outputs battery-required active power and battery-required reactive power which corresponds to a difference between the total active power in the turbine-required active power and a difference between the total reactive power and the turbine-required reactive power respectively, and a second mode in which the battery-required active power is maintained and the battery-required reactive power is reduced while the turbine reactive power is increased by an amount of the reduction of the battery-required reactive power such that a parent power exceeds a set battery unit apparent power.

U.S. Pat. No. 8,275,489, issued on Sep. 25, 2012 to T. J. Devine, shows a system and method for generating and distributing of commercial wind power. The deployment method centers on a commercial deployment of small-sized wind turbines that use existing power poles or similar structures to place the wind turbines high above the tree lines and in a clean air flow regime. Each wind turbine can provide power directly to the power grid at the point of generation for usage close to the point of generation. The power produced by each wind turbine can be metered at the wind turbine or the point of generation.

U.S. Pat. No. 8,378,621, issued on Feb. 19, 2013 to Singhal et al., teaches an energy farm system that harnesses energy from the environment and has an integrated energy collector that harnesses solar light radiation, solar heat radiation, and harnesses wind energy. The collector harnesses wind energy by a horizontal axis rotation windmill, harnesses solar light radiation by using a system of lenses that focus light to the center of the photovoltaic cells, and harnesses solar heat radiation by using a system of lenses that focus heat to the center of a heat exchanger.

U.S. Pat. No. 8,539,724, issued on Sep. 24, 2013 to Bullivant et al., describes a renewable energy system that includes a wind turbine and a solar cell panel connected to a battery bank.

U.S. Patent Application Publication No. 2012/0053750, published a Mar. 1, 2012 to Biassolo et al., provides a system, a method, and a computer program for optimally scheduling energy storage devices in a wind farm. The power production system includes an energy storage device configured to service a first energy storage application at the first wind farm and a supervisory controller configured to determine if an attribute of the energy storage device is less than or equal to a threshold for the first energy storage device. In response to the attribute being less than or equal to a threshold for the first energy storage application, the supervisory controller schedules the energy storage device for a second energy storage application at the first wind farm or at a second wind farm different than the first wind farm.

U.S. Patent Application Publication No. 2013/026822 2, published on Oct. 10, 2013 to Arya et al., provides a method for determining consistent wind power output which includes obtaining forecasted wind power production, actual wind power production from a wind power producer, a variable price of power measurement, a power storage battery state capacity measurement, and a penalty measurement for wind power change of rate. The method analyzes the forecasted wind power production, the variable price of power measurement, the power storage battery state capacity measurement, and the penalty measurement for wind power change of rate to determine a consistent rate at which the wind to power is to be exported from the wind power producer to a grid.

It is an object of the present invention to provide a renewable energy system that maximizes the capacity of the power inverter modules.

It is another object of the present invention to provide a renewable energy system that can be scaled as market conditions demand.

It is another object of the present invention to provide a renewable energy system that reduces the cost of the inverter modules.

It is another object of the present invention to provide a renewable energy system that avoids the use of large and costly battery banks.

It is another object of the present invention to provide a renewable energy system that can easily incorporate improvements in battery technology.

It is another object of the present invention to provide a renewable energy system that can reduce the cost of the wind farm.

It is still a further object of the present invention to provide a renewable energy system that can predict the power to the grid in advance.

It is still another object of the present invention to provide a renewable energy system that can control the rate of change of the grid power.

These and other objects and advantages of the present invention will become apparent from a reading of the attached specification and appended claims.

BRIEF SUMMARY OF THE INVENTION

The present invention is a renewable energy system that comprises a plurality of turbines separately connected to a line so as to form a turbine string, a plurality of turbine transformers respectively and separately connected to said plurality of turbines, a plurality of energy storage systems respectively and separately connected to said plurality of turbines so as to store energy from the plurality of turbines, and a distribution transformer connected to the turbine string so as to raise a voltage from the turbine string to a grid voltage.

The plurality of turbines can include a first plurality of turbines connected to a first turbine string and a second plurality of turbines connected to a second turbine string. The first and second turbine strings are connected to the distribution transformer. Each of the turbines is a wind power turbine system. A photovoltaic array can be connected to each turbine of the plurality of turbines.

The wind power turbine system includes a battery array, a generator connected to the battery array such that rotation of the battery array causes the generator to produce power, and an inverter cabinet having a plurality of inverter modules therein. The plurality of inverter modules are connected to the generator. The plurality of inverter modules, in one embodiment, includes a first pair of inverter modules connected to the generator so as to convert the power from the generator into a DC voltage, a DC link connected to the first plurality of inverter modules, a second pair of inverter modules connected to the energy storage system and to the DC link, and a third plurality of inverter modules connected between the DC link and the turbine transformer. A main network inductor is connected between the third plurality of inverter modules and the turbine transformers.

In another embodiment of the present invention, the plurality of inverter modules can include a first plurality of inverter modules connected to the generator so as to convert the power from the generator into a DC voltage, a DC link connected to the first plurality of inverter modules, and a second pair of inverter modules connected between the DC link and the turbine transformer. The energy storage system is directly connected to the DC link.

In a third embodiment, a photovoltaic array is connected to the wind power turbine system. In this third embodiment, the plurality of inverter modules includes a first plurality of inverter modules connected to the generator so as to convert the power from the generator into a DC voltage, a DC link connected to the first plurality of inverter modules, a second plurality of inverter modules connected to the photovoltaic array and to the DC link, and a third plurality of inverter modules connected between the DC link and the turbine transformer. The energy storage system is connected to the DC link.

In the present invention, the inverter cabinet has six inverter slots therein. The plurality of inverter modules is six and only six inverter modules respectively received in the six inverter slots of the cabinet. A controller can be connected to the turbine transformer and to the energy storage system so as to control a flow of power from the turbine transformer or from the energy storage system to the distribution transformer. Additionally, the controller can be used so as to control the flow of power from the photovoltaic array to the distribution transformer.

This foregoing Section is intended to describe the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
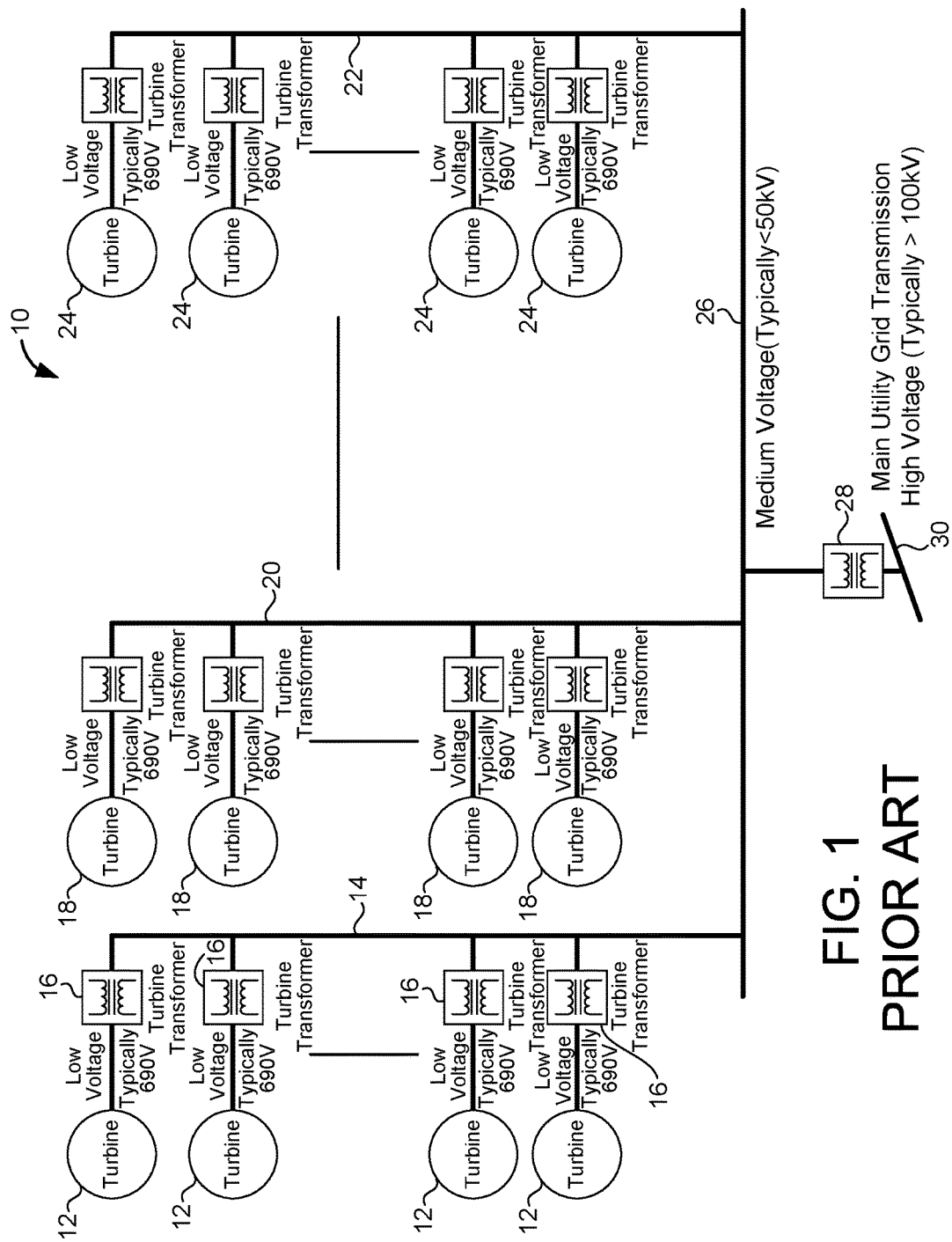
FIG. 1 is a diagrammatic illustration of a prior art renewable energy system.
Figure 2:
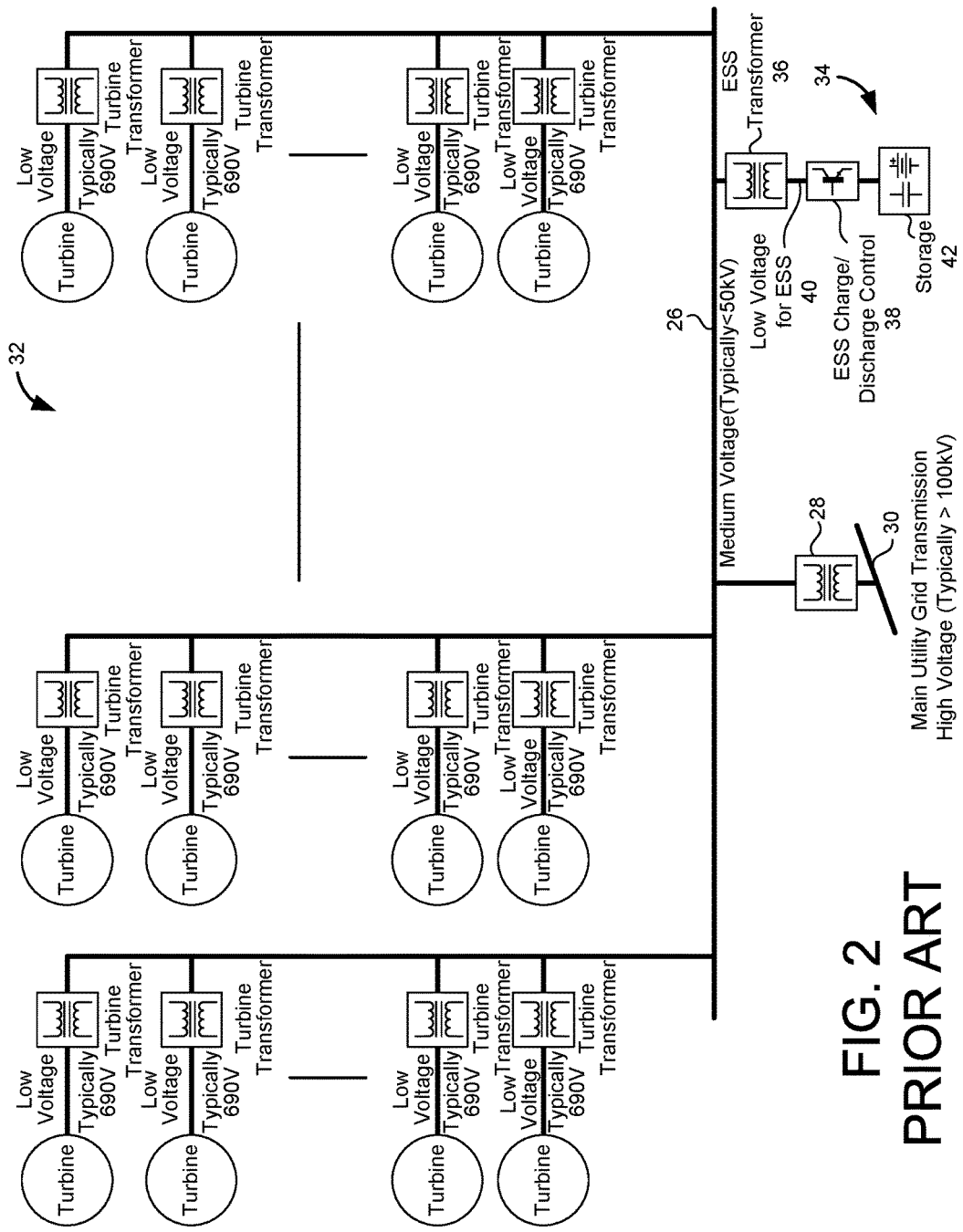
FIG. 2 is a diagrammatic view showing the prior art energy storage system which includes a battery bank.
Figure 3:
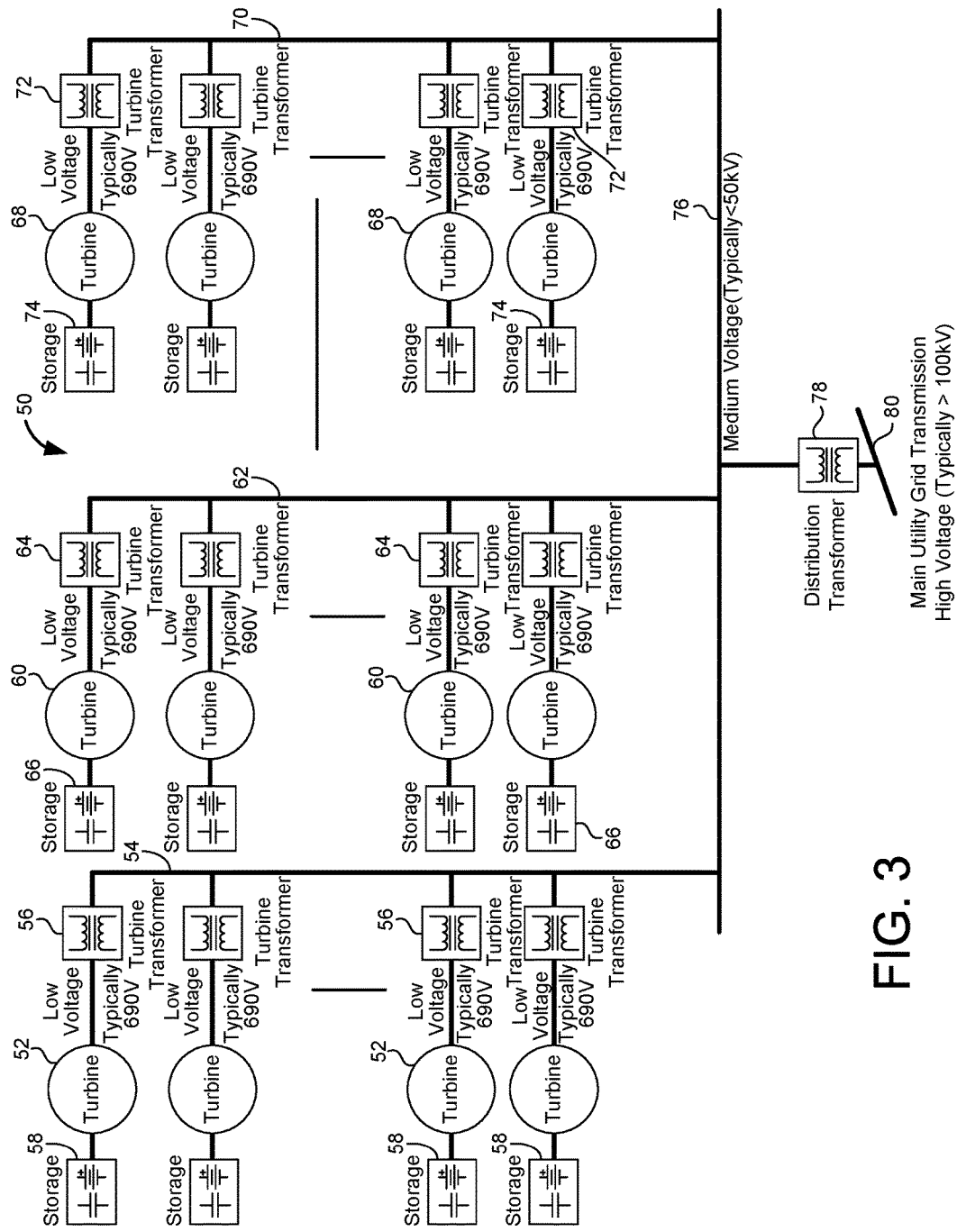
FIG. 3 is a diagrammatic illustration of a first and simplest embodiment of the present invention.

Referring to FIG. 3, there is shown the renewable energy system 50 in accordance with a simple form of the present invention. The renewable energy system 10 includes a plurality of turbines 52 that are separately connected to a line 54 so as to form a turbine string. There are a plurality of turbine transformers 56 that are separately and respectively connected to the plurality of turbines 52. The turbine transformers 56 are connected between the turbine 52 and the line 54. The turbine transformers 56 serve to convert the transmission voltage to a medium voltage, typically thirty-five kilovolts. Importantly, in the present invention, there are a plurality of energy storage systems 58 that are respectively and separately connected to the plurality of turbines 52. The turbines 52 will transmit a low voltage of approximately 600 volts. The turbine transformers will then increase the voltage to the transmission voltage. As can be seen, there could be a large number of turbines 52 that are connected to the line 54 that forms a first turbine string.

Another plurality of turbines 60 are connected to a line 62 that forms a second turbine string. As with the first turbine string, turbine transformers 64 are connected between the turbine 60 and the line 62. A plurality of energy storage systems 66 are separately and respectively connected to the plurality of turbines 60. There is yet another plurality of turbines 68 which are connected to line 70 so as to form an end turbine string in the renewable energy system 50. It can further be seen that there are a plurality of turbine transformers 72 that are respectively and separately connected to the plurality of turbines 68. There is also a plurality of energy storage systems 74 that are separately and respectively connected to the turbine 68.

Each of the lines 54, 62 and 70 (along with the various other turbine strings that are part of the wind farm) are connected to the distribution line 76. The distribution line 76 will carry a medium voltage of approximately fifty kilovolts. A distribution transformer 78 is connected to the distribution line 76 so as to elevate the voltage to the grid voltage. Distribution transformer 78 then feeds the voltage to the grid 80. The grid voltage would typically be greater than one hundred kilovolts.

In FIG. 3, it can be seen that, unlike the prior art, the present invention utilizes a single energy storage system, such as a battery or a capacitor, with each of the turbines in the wind farm of the renewable energy system 50. No additional distribution infrastructure is required. The existing turbine transformers are used to transform the power from the energy storage system 58. The additional power electronics are integrated into each of the wind energy generators which include the turbine 52. The capital expenditure and available energy storage can both be scaled and scheduled as the market conditions require. In the scheme of the renewable energy system 50, if the wind is insufficient, the power to the grid 80 is supplied by power from the energy storage system 58. If necessary, energy from the energy storage systems can be used so as to supplement the power for a low-producing turbine.

Unlike the prior art, the present invention does not utilize a battery bank that is connected to the distribution line 76. As such, the extreme cost associated with building the battery bank facility is avoided. Additionally, since each of the energy storage systems 58 can be in the nature of a battery, as battery technology improves, the improved batteries can easily be substituted for the previous batteries. If one of the energy storage systems should be defective or fail, it can easily be replaced without affecting the energy storage capacity for the remaining part of the system. Additionally, in the event of a terrorist act, or a lightning strike, the entire energy storage system for the renewable energy system will not fail, but rather only those energy storage systems that are directly affected can fail without affecting the remainder of the system.

Figure 4:
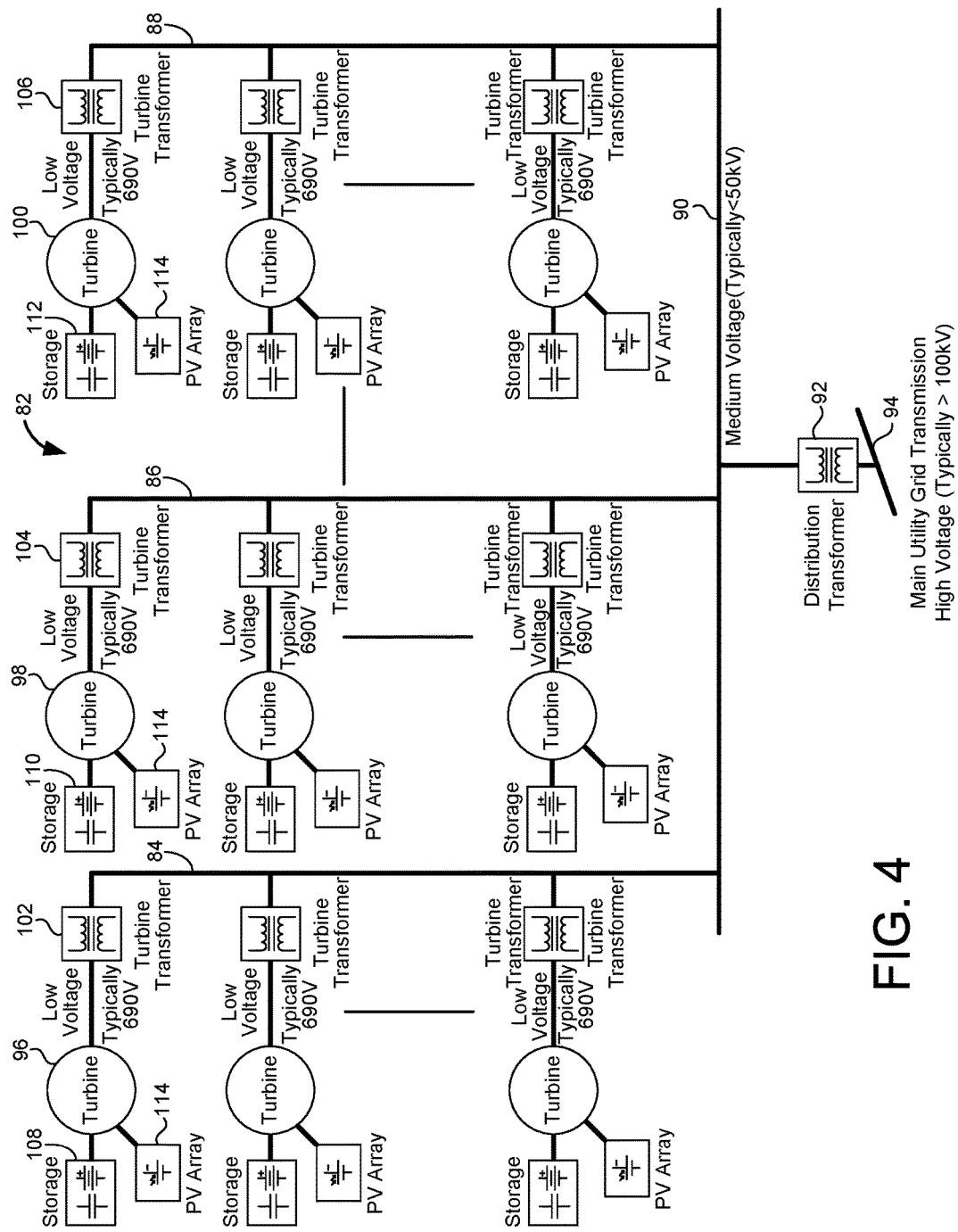
FIG. 4 is a diagrammatic illustration of an alternative embodiment of the energy storage system of the present invention employing photovoltaic arrays.

FIG. 4 shows an alternative embodiment of the renewable energy system 82 of the present invention. The renewable energy system 82 includes a first turbine string 84, a second turbine string 86, and a last turbine string 88 in the wind farm of the renewable energy system 82. Each of these turbine strings 84, 86 and 88 feeds to a distribution line 90. The distribution line 90 will feed to a distribution transformer 92 and then to the grid 94 in the manner of the previous embodiment of the present invention. Each of the turbine strings 84 and 86 will include turbines 96, 98 and 100, respectively. Similarly, each of the turbine strings 84, 86 and 88 will include turbine transformers 102, 104, and 106 in the manner described herein previously. A plurality of energy storage systems 108, 110 and 112 are connected respectively to the plurality of turbines 96, 98 and 100 in the manner described herein previously. Importantly, the major variation in FIG. 4 is that the renewable energy system 82 includes a plurality of photovoltaic arrays 114 that are respectively and separately connected to the turbines.

The photovoltaic arrays 114 are in the nature of solar panels. Each of the solar panels can be a solar array which surrounds each of the turbines. As such, under those conditions of low wind and high solar energy, the photovoltaic array can be utilized so as to supply power to the turbine strings and, in turn, to the grid 94. The energy from the photovoltaic array can also be stored by the energy storage system, as required. Since the photovoltaic array produces DC power, rather than AC power, it was not felt to be previously compatible with the wind power systems associated with the turbines of the prior art. As such, solar energy arrays have not been incorporated into wind power farms. The present invention, through the unique use of the inverter modules, as will be described hereinafter, allows compatibility between the solar arrays and the turbines.

Figure 5:
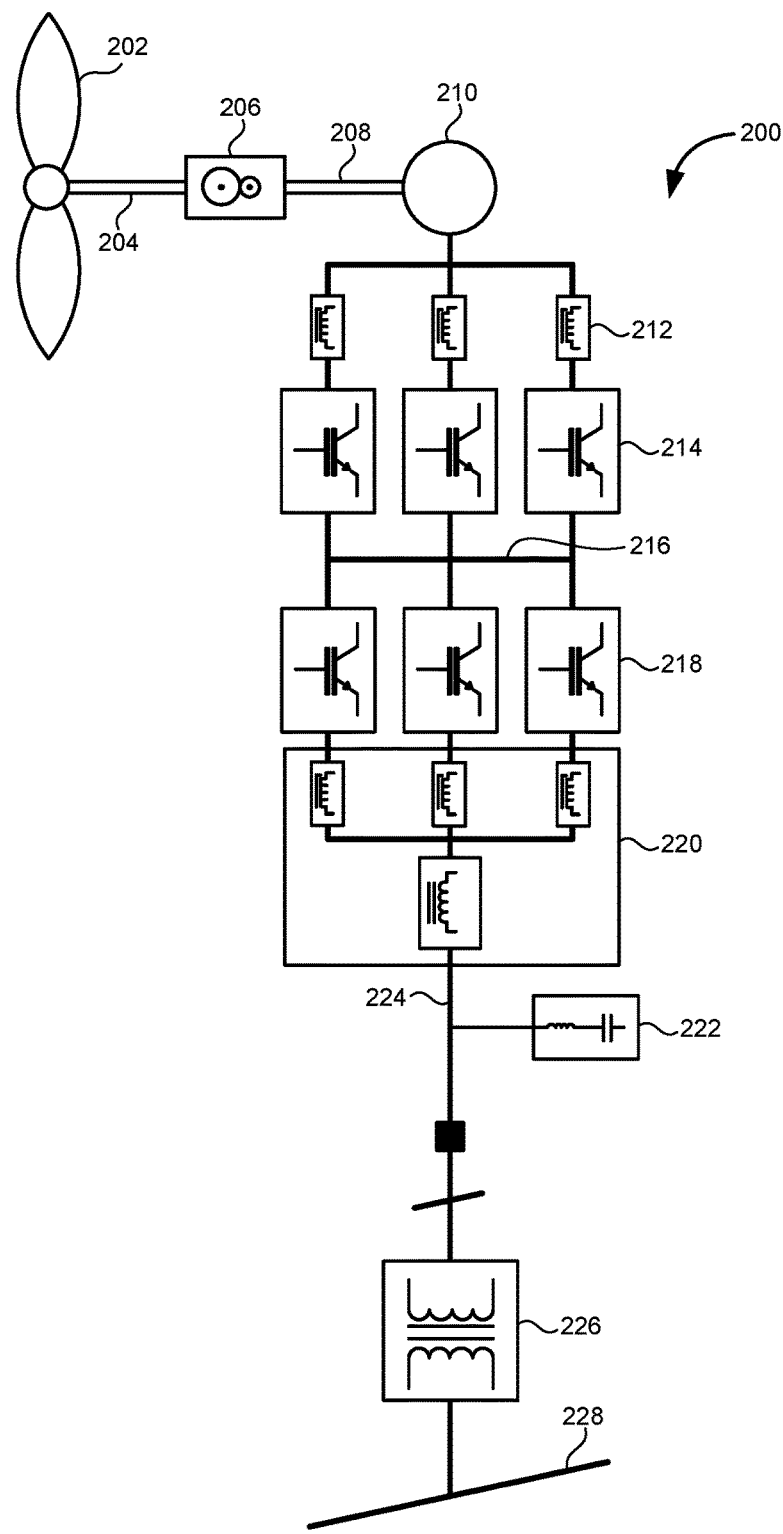
FIG. 5 is a block diagram showing a wind power turbine system of the prior art.

In FIG. 5, a wind power turbine system 200 of the prior art is illustrated. The wind turbine system 200 includes a blade array 202 which is connected to a shaft 204. Shaft 204 is connected to gearbox 206 which serves to transmit rotational energy of the shaft 204 to another shaft 208. Shaft 208 is connected to generator 210 such that a rotation of shaft 204 causes the generator 210 to produce power. The power from the generator 210 is passed through generator inverter module sharing reactors 212 and then to generator inverter modules 214. Importantly, there are three generator inverter modules that are connected to the generator 210. The generator inverter modules 214 will typically have a capacity of 800 amps. The generator inverter modules 210 then feed DC power to a DC link 216. DC link 216 would typically carry 1100 volts. Another set of inverter modules 218 is connected to the DC link 216. Once again, there are three inverter modules 218 that are connected to the DC link 216. Each of the inverter modules 218 will have an 800 amp capacity. The second set of inverter modules 218 is then connected to the main network inductor 220. A PWM filter 222 is connected to the output line 224 from the main network conductor 220 so as to properly filter and condition the power from line 228. Line 224 will pass 690 volts of three-phase 50/60 Hz of power to the turbine transformer 226 and then to the distribution line 228.

In FIG. 5, there are three inverter modules in each of the sets 214 and 220. As such, a total of six inverter modules are positioned within an inverter cabinet. Since the inverter cabinet has six slots, the six inverter modules are received within the conventional inverter cabinet. Since inverter modules are extremely expensive, it is desirable to minimize the number of inverter modules that are used.

Figure 6:
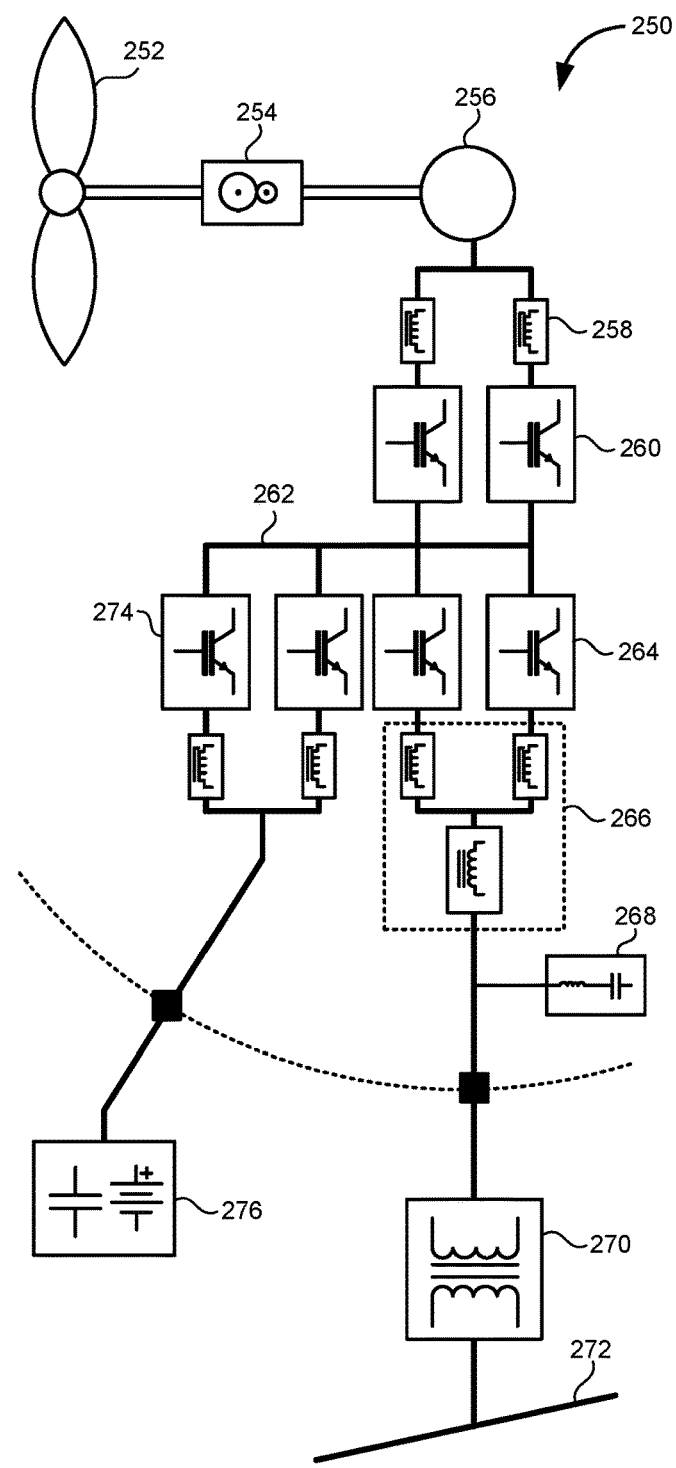
FIG. 6 is a block diagram showing a second embodiment of the wind power turbine system used in the present invention.

FIG. 6 shows a first embodiment of the wind power turbine system 250 as employed within the renewable energy system of the present invention. As with the prior art, the wind power turbine system 250 includes a blade array 252, a gearbox 254, a generator 256, and generator inverter module sharing reactors 258. Unlike the prior art, the wind power turbine system 250 includes two generator inverter modules 260. These generator inverter modules have a 1200 amp capacity. The generator inverter modules 260 will serve to convert the AC power from the generator 260 into DC power to the DC link 262. DC link 262 connects the first set of inverter modules 260 to a second set of inverter modules 264. The second set of inverter modules 264 are network inverter modules each having a 1200 amp capacity. The second set of inverter modules 264 then passes power to the main network inverter 266 and then through the PWM filter 268 and outwardly to the turbine transformer 270. Turbine transformer 270 is then connected to the line the turbine string 272.

Importantly, in FIG. 6, there is a third set of inverter modules 274 that is connected to the DC link 262. The third set of inverter modules 274 is then connected to the energy storage system 276. Any range of batteries used in the energy storage system 276 is possible because the use of the inverter modules 274. The energy storage system 276 will transmit constant voltage to the DC link 262. As such, the present invention avoids any need for separate controllers in order to maintain the constancy of the voltage flowing to the DC link 262.

The present invention, as shown in FIG. 6, also utilizes 1200 amp inverter modules, as opposed 800 amp inverter modules. As such, the six inverter module slots found in the inverter cabinet can accommodate the higher capacity of the 1200 amp inverter modules used in sets 260, 264 and 274. The wind powered turbine system 250 utilizes a constant DC link voltage. The dedicated battery charging modules allow direct control of flow into and out of the storage system.

Figure 7:
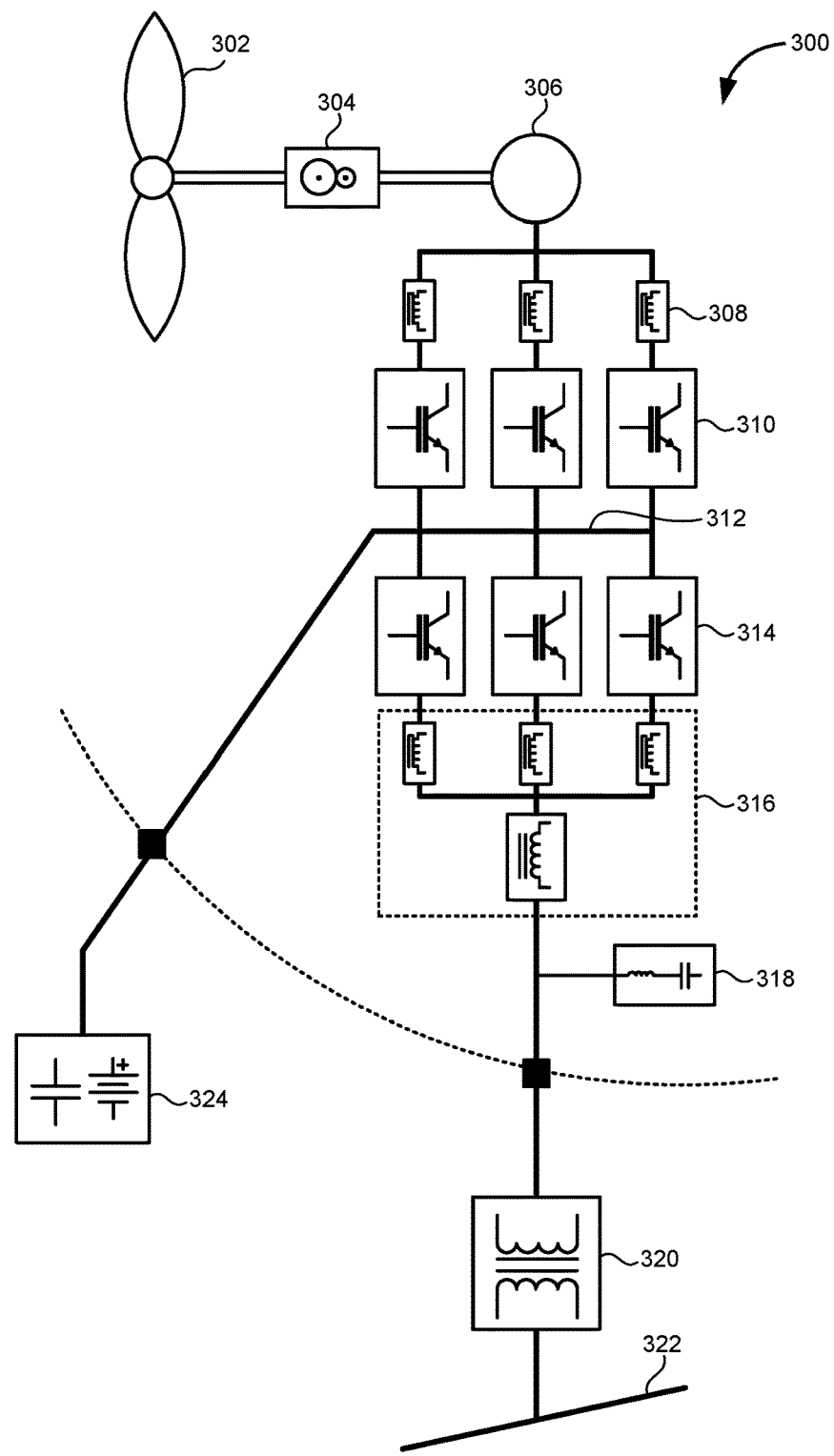
FIG. 7 is a block diagram showing a third embodiment of the wind power turbine system of the present invention.

FIG. 7 shows a second alternative embodiment of the wind power turbine system 300 of the present invention. As with the prior art, the wind power turbine system 300 includes blade array 302, gearbox 304, generator 306, and generator inverter module sharing reactors 308. The generator inverter module sharing reactors 308 pass power to a first set of generator inverter modules 310. These generator inverter modules 310 are three in number. Each of the generator modules can have a capacity of 800 amps. However, with the present invention, if 1200 amp generator inverter modules are available, then only two inverter modules can be used in place of the three shown in set 310. As with the prior art, the first set of inverter modules 310 feeds to a DC link 312 and then to a second set of inverter modules 314. Inverter modules 314 will then pass power to the main network inverter 316, through the PWM filter 318, and to the turbine transformer 320. Turbine transformer 320 can then pass the power to the turbine string 322.

In the embodiment of the wind power turbine system 250 of FIG. 6, the third set of generator inverter modules 274 were used so as to assure a constant voltage to the DC link 312. However, in FIG. 7, this set of inverter modules is omitted. As such, the energy storage system 324 is directly connected to the DC link 312. The power to the DC link 312 will be variable between 1100 volts to 1200 volts. As such, this avoids the high cost of the inverter modules 274. However, since the DC link voltage is now variable, the power flow to or from the battery is achieved by controlling power flow from the generator 306 into the network. The system will work without reduction in power rating. Importantly, since the energy storage system 324 is in the nature of the battery, and although the voltage will vary depending upon the charge in the battery, this variation in voltage is relatively small. As such, the direct connection of the energy storage system 324 to the DC link 312 will work in the system 300 of the present invention.

Figure 8:
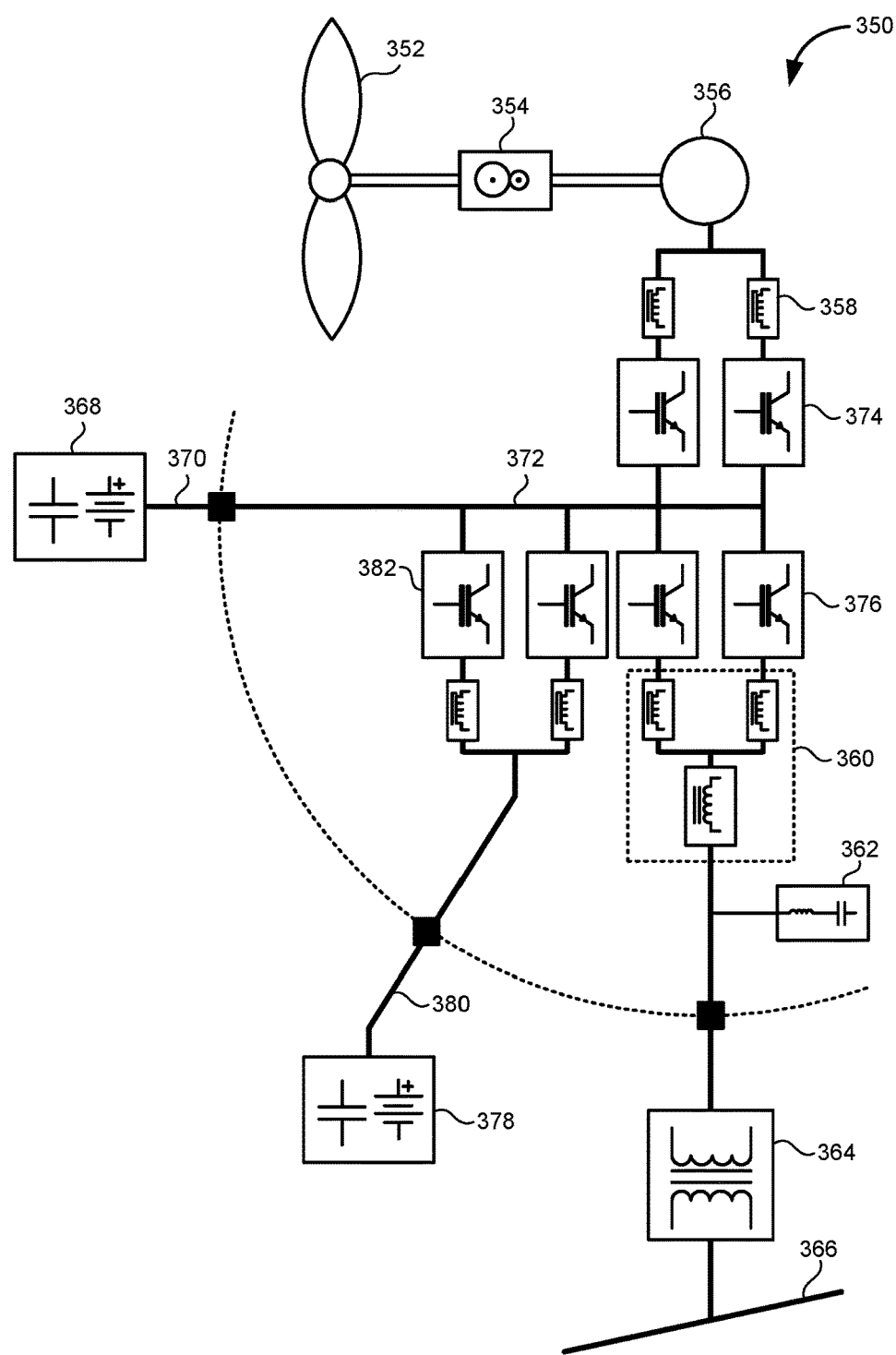
FIG. 8 shows a fourth embodiment of the wind power turbine system as used in the present invention.

FIG. 8 shows a second alternative embodiment of the wind power turbine system 350 of the present invention. As with the prior art, the wind power turbine system 350 includes the blade array 352, the gearbox 354, the generator 356, the generator inverter module sharing reactors 358, the main network inductor 360, the PWM filter 362 and the turbine transformer 364. Turbine transformer 364 is then connected to the turbine string 366.

In the wind power turbine system 350, it can be seen that the energy storage system 368 is connected by line 370 directly to the DC link 372. The first set of generator inverter modules 374 are two in number with each inverter module having a 1200 amp capacity. Similarly, the second set of inverter modules 376 will be to a number and have a 1200 amp capacity. Since the DC link 372 is connected to the variable voltage energy storage device 368, the DC link 372 will have a variable voltage of between 1100 volts and 1200 volts.

A photovoltaic array 378 is illustrated as connected by line 380 to a third set of inverter modules 382. The third set of inverter modules 382 are two in number with each having a capacity of 1200 amps. The third set of inverter modules 382 are necessary in the scheme shown in FIG. 8 since the voltage from the photovoltaic array 378 is variable. As such, the photovoltaic inverter modules 382 will maintain generally constant voltage to the DC link 372. The system would be power limited by the network side inverter and transformer. As such, it would not operate at simultaneous maximum rating from both the photovoltaic array 378 and the wind power sources.

Figure 9:
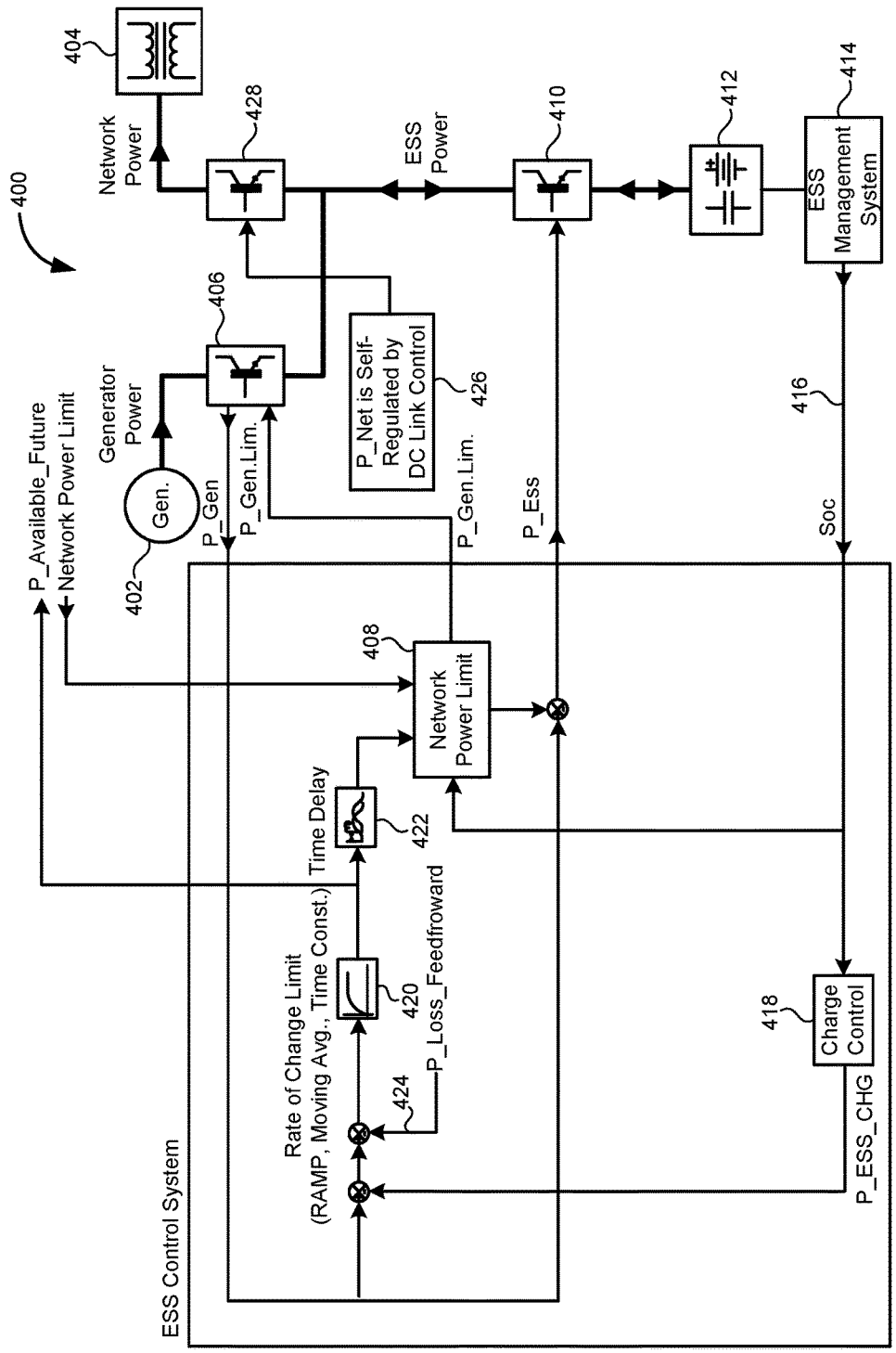
FIG. 9 is a flow diagram showing the operation of the controller in association with the first embodiment of the present invention.

FIG. 9 illustrates a control system 400 for the constant DC link power system of FIG. 6. The control system is cooperative with the generator power from generator 402 and with the network power flowing to the transformer 404. Switch 406 serves to switch the actual power $P_{GEN}$ from the generator 402. The switch 406 can receive a command from $P_{GEN\ LIM}$ so as to reduce the power from the generator 402. This would only be active if the energy storage system is charged the capacity and the network power limit 408 is below the maximum available from the generator 402. Switch 410 is cooperative with power flow required into and out of the energy storage system 412. The controller 414 senses the charge in the energy storage system 412 and can pass a signal 416 representative of this state of charge (SOC). This goes to a charge controller 418 so as to pass the demanded power flow $P_{ESS\ CHG}$ into the energy storage system 412 to bring the state of charge to its target value. A rate of change limit circuit 428 and a time delay circuit 422 is provided so as to control when the power is to be released from the energy storage system 402 and into the network. The known power loss within the system at current operating conditions is shown at line 424 as $P_{LOSS\ FEEDFORWARD}$. A DC link control 426 is cooperative with switch 428 so as to regulate the power output to the transformer 404 and then to the network.

The control system 400, as shown in FIG. 9, allows available power to the network to be predicted at a fixed period in advance. This allows the grid operator to plan accordingly. This serves to make the effect of the wind not only more constant but actually to tell the utility what the power output will be in advance of providing the power. In particular, the control system 400 can send a signal to the network or to the utility that power will be released at a predetermined time period. Since the utility would like a flat power output and would desire to limit the rate of change of the signal, the present invention can facilitate these requirements of the utility. In general, the amount power that can be provided would be the power produced by the generator 402, subtracting the power from the energy storage system 412 and subtracting losses in the system. As such, this would provide a number as to how much power makes it back into the network. In the control system 400 of the present invention, the rate of change of grid power is controlled. As such, this is a significant benefit to the grid operator. Within the limits of storage capacity, power delivered to the grid can be limited while still harvesting the maximum energy from the wind. The excess power is stored for delivery when the wind reduces.

Figure 10:
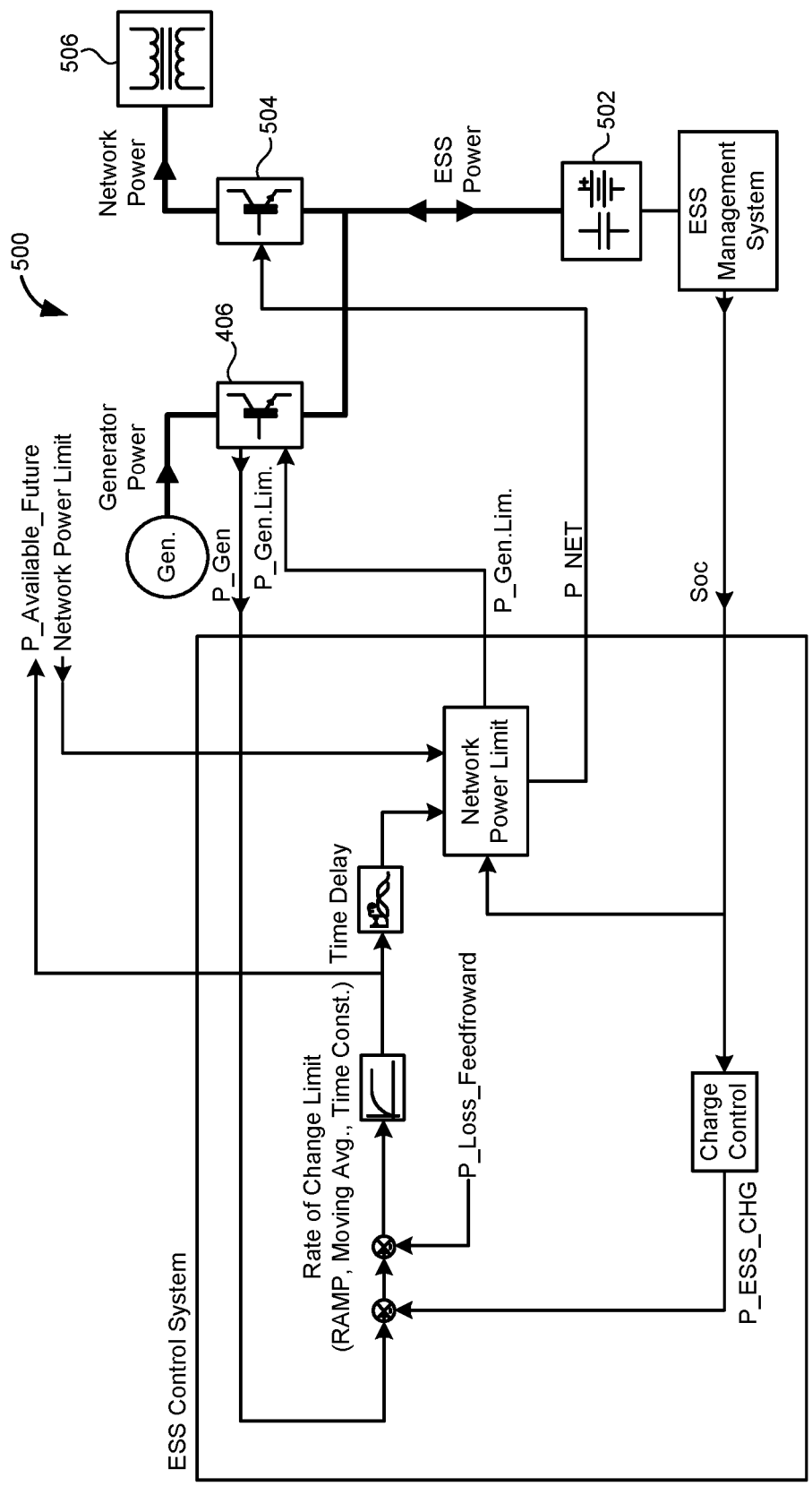
FIG. 10 is a block diagram showing the controller of the present invention is used with the second embodiment of the present invention.

FIG. 10 shows a control system 500 that can be used with the renewable energy system of FIG. 7. As can be seen, the schematic is similar to that of FIG. 9. The main difference is that instead of directly controlling the ESS power from the energy storage system 502 and letting the network power be defined by the power balance, the network power is directly controlled and the ESS power is defined by the power balance. The switch 504 directly controls the network power flowing to the transformer 506.

Figure 11:
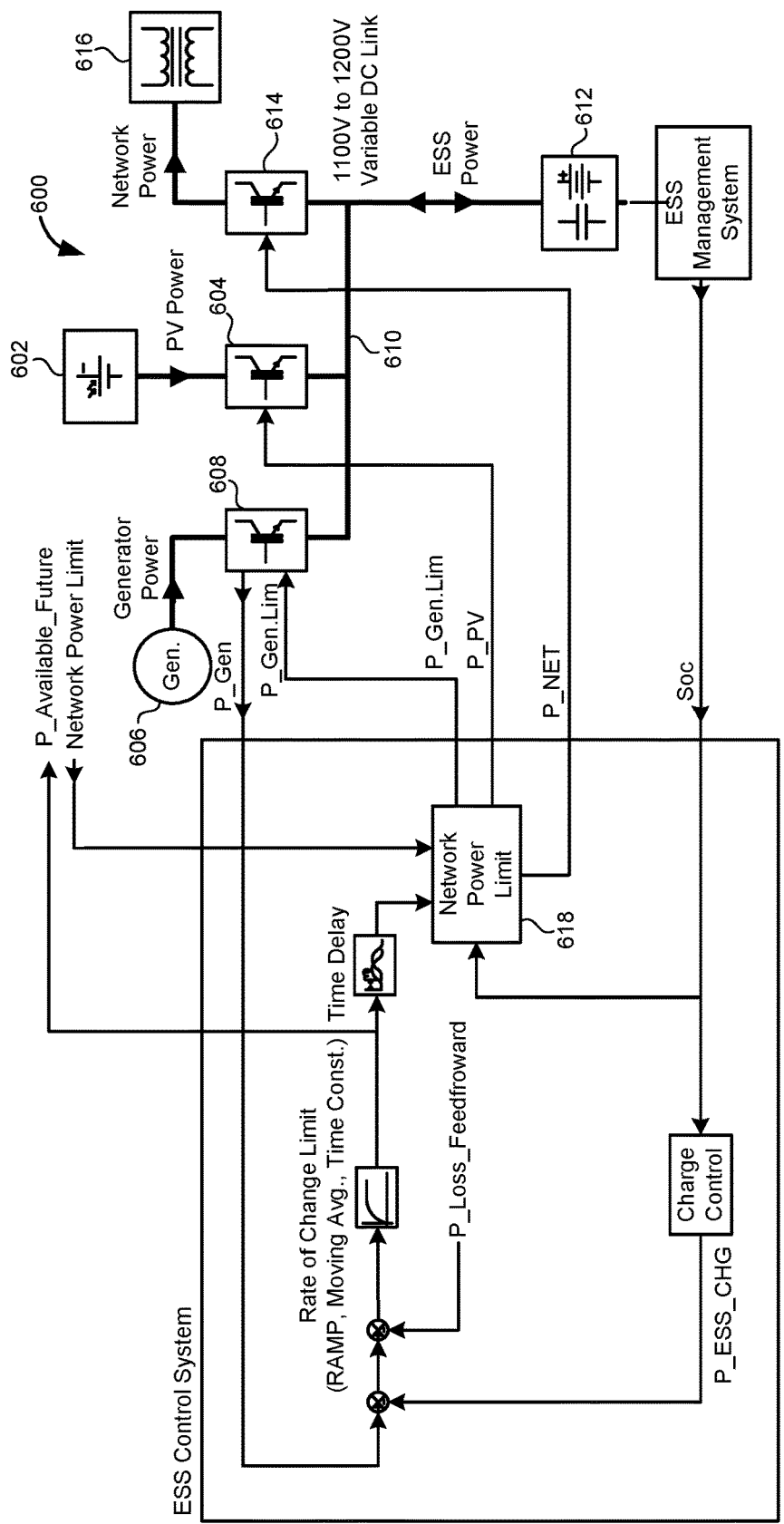
FIG. 11 is a flow diagram of the controller is used in the third embodiment of the present invention.

FIG. 11 shows the control system 600 as used in association with the embodiment of the renewable energy system of FIG. 8. In particular, in FIG. 10, it can be seen that the photovoltaic array 602 is connected to switch 604. The power from the generator 606 passes through switch 608 and then to the DC link 610. Similarly, the power from the photovoltaic array 602 will flow into the DC link 610. Also, power from the energy storage system 612 will also be connected to the DC link. Switch 614 can deliver the network power to the transformer 616 and then to the grid. As such, this control system, which is similar to that shown in FIG. 9, can be adapted for controlling the power from the photovoltaic array 602. In particular, the network power limit 618 provides the signal to the switch 604 with respect to the activating or deactivating of energy flowing from the photovoltaic array.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A renewable energy system comprising:
   a plurality of turbines separately connected to a line so as to form a turbine string, each of said plurality of turbines being a wind power turbine system, each of said plurality of wind power turbine system comprising:
   a blade array;
   a generator connected to said blade array such that a rotation of said blade array causes said generator to produce power; and
   an inverter cabinet having a plurality of inverter modules therein, said plurality of inverter modules connected to said generator, said inverter cabinet having six inverter module slots therein, said plurality of inverter modules being six inverter modules respectively received in said six inverter module slots of said cabinet;
   a plurality of turbine transformers separately and respectively connected to each turbine of said plurality of turbines;
   a plurality of batteries separately and respectively connected to each turbine of said plurality of turbines so as to store energy from the turbine, said plurality of batteries connected to said turbine string so as to selectively supply power to said turbine string; and
   a distribution transformer connected to said turbine string so as to raise a voltage from said turbine string to a grid voltage.

2. The renewable energy system of claim 1, said plurality of turbines comprising:
   a first plurality of turbines connected to a first turbine string; and
   a second plurality of turbines connected to a second turbine string, said first and second turbine strings connected to said distribution transformer.

3. The renewable energy system of claim 1, said plurality of inverter modules comprising:
   a first pair of inverter modules connected to said generator so as to convert the power from said generator into a DC voltage;
   a DC link connected to said first plurality of inverter module;
   a second pair of inverter modules connected to said energy storage system and to said DC link; and
   a third plurality of inverter modules connected between said DC link and said turbine transformer.

4. The renewable energy system of claim 3, further comprising:

a main network inductor connected between said third plurality of inverter modules and said turbine transformer.

5. The renewable energy system of claim 1, said plurality of inverter modules comprising:
a first plurality of inverter modules connected to said generator so as to convert the power from said generator into a DC voltage;
a DC link connected to said first plurality of inverter modules, said energy storage system connected to said DC link; and
a second pair of inverter modules connected between said DC link and said turbine transformer.

6. The renewable energy system of claim 1, further comprising:
a photovoltaic array connected to the wind power turbine system.

7. A renewable energy system comprising:
a plurality of turbines separately connected to a line so as to form a turbine string, each of said plurality of turbines being a wind power turbine system, each of said plurality of wind power turbines comprising:
a blade array;
a generator connected to said blade array such that a rotation of said blade array causes said generator to produce power; and
an inverter cabinet having a plurality of inverter modules therein, said plurality of inverter modules connected to said generator;
a plurality of turbine transformers separately and respectively connected to each turbine of said plurality of turbines;
a plurality of batteries separately and respectively connected to each turbine of said plurality of turbines so as to store energy from the turbine, said plurality of batteries connected to said turbine string so as to selectively supply power to said turbine string;
a distribution transformer connected to said turbine string so as to raise a voltage from said turbine string to a grid voltage;
a photovoltaic array connected to said wind power turbine system;
a first plurality of inverter modules connected to said generator so as to convert the power from said generator into a DC voltage;
a DC link connected to said first plurality of inverter modules, said energy storage system connected to said DC link;
a second plurality of inverter modules connected to said photovoltaic array and to said DC link; and
a third plurality of inverter modules connected between said DC link and said turbine transformer.

8. The renewable energy system of claim 1, further comprising:
a controller connected to said turbine transformer and to said plurality of batteries so as to control a flow of power from said turbine transformer or said energy storage system to said distribution transformer.

9. A wind power turbine system comprising:
a blade array;
a generator connected to said blade array such that a rotation of said blade array causes said generator to produce power;
a first plurality of inverter modules connected to said generator;
a DC link connected to said first plurality of inverter modules;
a second plurality of inverter modules connected to said DC link;
a turbine transformer connected to said second plurality of inverter modules, said turbine transformer for passing power to a power transmission line;
a battery connected directly to said DC link;
a photovoltaic array; and
a third plurality of inverter modules connected between said DC link and said photovoltaic array.

10. The wind power turbine system of claim 9, further comprising:
a main network inductor connected between said third plurality of inverter modules and said turbine transformer.

* * * * *

UNITED STATES PATENT AND TRADEMARK OFFICE
CERTIFICATE OF CORRECTION

| | |
|---|---|
| PATENT NO. | : 10,288,041 B2 |
| APPLICATION NO. | : 15/401312 |
| DATED | : May 14, 2019 |
| INVENTOR(S) | : Williams et al. |

It is certified that error appears in the above-identified patent and that said Letters Patent is hereby corrected as shown below:

On the Title Page

Item (12) delete "Williams" and insert -- Williams et al. --.

Item (72) Reads:
Kevin R. Williams, Cypress,TX (US)
Add as co-inventor:
Gary PACE, Leander, TX (US)

Signed and Sealed this
Sixth Day of September, 2022

Katherine Kelly Vidal
*Director of the United States Patent and Trademark Office*